3,148,217
CATALYTIC HYDROGENATION OF HALO-
NITROBENZENE COMPOUNDS
Harlan B. Freyermuth, Easton, Pa., and James B. Norm-
ington, Little Silver, and Eugene V. Hort, Plainfield,
N.J., assignors to General Aniline & Film Corporation,
New York, N.Y., a corporation of Delaware
No Drawing. Filed Nov. 16, 1961, Ser. No. 152,903
19 Claims. (Cl. 260—580)

This invention relates to an improved method for the reduction of halonitrobenzene compounds, and in particular to a method for the catalytic hydrogenation of such compounds wherein the halogen atom or atoms present are "active" halogens. This invention is further particularly concerned with an improved process for the catalytic hydrogenation of active hologen-containing nitrobenzene compounds wherein the reduction is carried out in the liquid phase and in the presence of the water produced during the course of the reaction, the said water being present as a second and discrete liquid phase, no other solvent or diluent being added or present.

Aromatic nitro compounds have long been reduced to the corresponding aromatic amines by a great number of different methods. Among these is, for example, the use of iron borings and dilute acid. In addition, zinc, tin, and stannous chloride, with or without acid, alkaline sulfides and a great variety of other reducing agents have been used. New techniques have been developed within recent years employing molecular hydrogen with various catalysts to effect the direct reduction of nitro compounds to the corresponding amines. Such catalytic hydrogenation techniques offer many advantages over the previously employed chemical methods, especially with respect to economy, operating complexities, versatility, separation of products and the ease of adaptation to continuous processing. Such catalytic hydrogenation techniques have been used with the aromatic nitro compounds in both liquid and the vapor phase, and a great number of different catalyst systems have been suggested as suitable for the different techniques, primarily becasue of many inherent disadvantages which arise from the use of the catalytic hydrogenation technique. The major problems encountered in the catalytic reduction of aromatic nitro compounds are the fouling of the catalyst or its inactivation, and the production of undesired by-products and side reactions necessitating extremely careful control of operating conditions such as catalyst concentration, catalyst purity, purity of nitro compound, temperatures, pressures, selected solvents and diluents where employed, and the like. One of the major difficulties encountered has been the inactivation of the catalyst by the products formed during the reaction, i.e., reduction, such as water. Another difficulty lies in the undesired by-products of the reaction which may result in forming undesirable high temperature build-up within the reaction zone in localized areas. Since the reduction of nitro compounds is an exothermic one, it has heretofore been considered essential to operate within careful limits of temperature in order to prevent a run-away of the reaction with the possibility of a subsequent violent exothermic decomposition. To obviate such a situation, it has been proposed to employ various solvents and diluents in the reaction zone to moderate the rise of temperature during the reduction stages.

With the compounds of the type herein contemplated, namely, active halogen-containing nitrobenzenes, the catalytic hydrogenation techniques have been uniformly unsuccessful due to the dehalogenation which occurs during such reduction. It has been found, for example, that noble metal catalysts such as 5% palladium-on-charcoal causes extreme dehalogenation to accompany reduction and to interfere with the quality of the desired product. For instance, in the catalytic reduction of 2,5-dichloronitrobenzene in the presence of 5% palladium-on-charcoal catalyst, a considerable quantity of metachloroaniline is formed which cannot be readily separated from the desired product which is 2,5-dichloroaniline. Such catalyst of the noble metal type, therefore, cannot be employed in catalytic hydrogenation tecniques. It is therefore significant to note that in the Béchamp or iron reduction of 2,5-dinitrochlorobenzene, 2-chloronitrobenzene, and other nitrobenzene derivatives containing active halogens, the presence of even minute quantities of nickel in the iron borings gives similar difficulties as encountered in the catalytic hydrogenation processes employing noble metal catalysts, namely, dehydrohalogenation. In addition to this undesirability of the presence of nickel, it is further known that many nickel catalysts, and especially those of the Raney type, could not be successfully used in a highly stirred reactor where reduction of a nitro compound was being carried out due to the fact that the catalyst became "plastered" on the walls of the reactor and would not remain adequately dispersed throughout the reaction mass due to the wetting of the catalyst by the water evolved during the course of the reaction. To overcome this deficiency with such catalysts, various techniques have been advocated, among them the removal of the water as vapor formed during the reaction to prevent the formation of a separate aqueous phase. See U.S. Patent 2,292,879. In U.S. Patent 2,458,214, control of the reaction temperature is effected by means of the injection of an inert liquid such as water into the reaction zone and the removal thereof in the form of steam so that there is no separate aqueous phase in the reaction zone.

The recognition of the problems of dehydrohalogenation in the catalytic hydrogenation of chloronitrobenzene compounds is very clearly presented in U.S. Patent 2,772,313, wherein this feature is emphasized, although it is interesting to note that the examples are restricted in this patent to the reduction of meta-chloronitrobenzene, a compound which contains an inactive chlorine atom. In this patent a rhodium metal catalyst is employed and there is emphasized the use of an organic solvent and the precautions against the formation of an aqueous phase.

It has now been discovered that halonitrobenzene containing at least one halogen atom which may be designated as "active," and particularly those derivatives which contain at least one halogen atom in an ortho or para position to the nitro group may be successfully catalytically hydrogenated in excellent yields without dehalogenation and in the absence of any added solvent, and in the presence of the water of reaction formed during the reduction by the use of sponge nickel type catalysts, e.g., Raney nickel, or supported nickel catalysts such as nickel or kieselguhr.

The halonitrobenzenes which are herein contemplated are monocyclic mononitrocarbocyclic compounds containing at least one halogen atom which is "active," the said halogen atom being present in a position ortho or para to the nitro group. There may be present several other active halogens in the molecule as well as other inactive halogens, e.g., halogens in the meta position, or substituents on aliphatic side chains. In addition, the benzene nucleus may contain any other inert substituent such as alkyl and the like. Halogen atoms which may be present include fluorine, chlorine, bromine and iodine. Alkyl substituents may be any from 1 to about 18 carbon atoms.

It is indeed surprising that efficient reduction can be obtained to yield a product of excellent quality with the forementioned type of catalyst at comparatively mild conditions of reaction such as moderate temperatures and pressures. It is an essential feature of the present invention, in order to obtain good quality material in acceptable yields, that the reaction be carried out in a highly stirred reaction zone whereby the water formed during the reaction remains well dispersed throughout the liquid in the reaction zone as a separate and distinct liquid phase, and the catalyst system employed be similarly well dispersed as a distinct and separate solid phase. It is preferred that the reaction zone be provided with some means of cooling to remove the heat of reaction and thereby provide adequate control of the moderate temperatures employed during the catalytic reduction phase. The process of this invention thereby provided a means for effecting reduction of active halogen containing nitrobenzenes which eliminates the cost of solvents, the contamination of products by solvents, the poisoning of catalysts by solvents, the hazards of volatile and inflammable solvents, the poisoning and inactivation of catalysts by undesirable by-products, the inactivation of the catalyst by the water formed during the reduction of the nitro compound, the need for elaborate and complex techniques for controlling the temperature of the reaction and the removal of the water formed during the reduction, and finally, the process of this invention overcomes the major problem of dehalogenation of the active halogen-containing nitrobenzenes whereby excellent yields of high purity material are forthcoming.

It is therefore an object of the present invention to provide a process for the catalytic hydrogenation of active halogen-containing nitrobenzenes.

It is still another object of the present invention to provide a simple and efficient process for catalytically hydrogenating active halogen-containing nitrobenzenes in the liquid phase.

It is still another object of the present invention to provide a catalytic hydrogenation process for the production of active halogen-containing aminobenzenes in the absence of any added solvent or diluent.

It is still a further object of the present invention to provide a process to effect the catalytic hydrogenataion employing nickel catalysts of active halogen-containing nitrobenzenes in the absence of any added solvent or diluent which is safe and efficient and does not require complex techniques for removal of the water of reaction during the course of the reduction.

It is still another object of the present invention to provide a process for the catalytic hydrogenation of active halogen-containing nitrobenzenes in a highly stirred reaction zone under moderate conditions of temperature and pressure whereby dehalogenation is obviated.

Other objects will appear hereinafter as the description proceeds.

The catalysts which are herein contemplated are nickel catalyst either of the sponge nickel type or of the supported type wherein the nickel is employed on an inert, usually siliceous type base material. Examples of such catalysts are Divison's Sponge Nickel Catalyst or Girdler's G–45. The amount of catalyst employed may vary from about 0.1% to about 10% by weight based on the weight of the nitro compound, and preferably of about 1% to about 5%. As pointed out above, the present process employs no added solvent or diluent but is operable directly upon the undiluted nitro body, and as a consequence, the said nitro material must be a liquid at the temperature employed during the reduction as well as the corresponding reduced form thereof, i.e., the amine. The temperatures which are herein contemplated range from about 25° C. to about 125° C. and therefore the nitro compounds and corresponding amino reduction products should have a melting point within this range to be operable in the instant process. The pressures employed may range from atmospheric to about 150 p.s.i.g. Although increased pressures may be used, no particular advantage is gained thereby.

In order to effect the desired dispersion of the water formed during the course of the reaction throughout the reaction zone and to maintain the catalyst in an adequate state of dispersion, it is necessary to carry out the reaction in the presence of a high degree of suitable agitation. Any means for effecting a well dispersed state of the water and the catalyst may be resorted to. In addition to the usual agitation means, one may also employ supersonics in lieu of conventional mechanical agitators. When employing the latter, a preferential speed within the liquid of about 500 to 800 feet per minute will produce a suitable and adequate dispersion of the water and the catalyst as separate and distinct liquid and solid phases. When employing sponge nickel catalysts of the Raney type, it is necessary first to flush the catalyst with a water-miscible organic solvent such as isopropanol, methyl Cellosolve and the like. Such catalysts are supplied in water since they are highly pyrophoric. By flushing the catalyst with the water-miscible solvent, an excellent dispersion of the catalyst in the nitro body is obtained, and the catalyst remains well dispersed in the reaction mixture during the course of the reduction in spite of the two-liquid phase system which results due to the water formed during the hydrogenation.

Suitable compounds for reduction containing active halogens in either the ortho, para or both ortho and para positions include the following:

4-chloronitrobenzene
2-chloronitrobenzene
2,5-dichloronitrobenzene
2,6-dichloronitrobenzene
4-chloro-3-nitrobenzotrifluoride
2,4-dichloronitrobenzene
2,3-dichloronitrobenzene
2,3,4-trichloronitrobenzene
2-iodonitrobenzene
2,6-dibromonitrobenzene
3,4-dibromonitrobenzene
2,5-dibromonitrobenzene
2-chloro-4-bromonitrobenzene
4-chloro-3-bromonitrobenzene
6-chloro-2-bromonitrobenzene
4-fluoronitrobenzene
6-fluoro-2-nitrotoluene
2-chloro-5,6-dimethylnitrobenzene, and the like.

The general process may be carried out either on a batch scale in one reactor, or on a continuous basis with one or more stirred reactors or compartments. In the case of batch reductions, the catalyst is initially dispersed in the liquid nitro derivative whereas in the continuous reduction technique the catalyst and liquid nitro derivative are continuously added to an emulsion of the products of the reduction, i.e., amine and the percentage of water corresponding to that which is formed in the reduction.

The following examples will serve to illustrate the present invention without being deemed limitative thereof. Where parts are used, they are to be interpreted as parts by weight unless otherwise indicated.

*Example 1*

5.4 g. of 68.2%=3.66 g. 100% (1% based on nitro) Davison Sponge Nickel Catalyst (Raney type; water suspended) is flushed with isopropanol by stirring for 3 minutes with 50 cc. isopropanol allowing the nickel to settle during 5 minutes, decanting the clear liquid layer and repeating the operation with an additional 50 cc. isopropanol. 384 g. (2 moles) 2,5-dichloronitrobenzene is melted in a 32 oz. wide mouth bottle on the steam bath. 10 g. anhydrous sodium acetate is added while stirring with a glass rod. The isopropanol-flushed nickel catalyst is then added while stirring. The nickel catalyst is rinsed into the molten nitro material with a few cc.'s of isopropanol. The molten mixture is charged into a 2.5 liter stainless steel hydrogenator equipped with a turbine type agitator which is capable of maintaining a peripheral speed of 700 ft. per minute. The reduction is carried out at approximately 95° C. under 100 p.s.i.g. hydrogen for about 7 hours. 397.5 g. of reaction mixture is received from the reactor. 387 g. of this material is dried by distillation under vacuum through an efficient still head to prevent entrainment (equivalent to approximately two plates). The residue or dry weight is 319 g. The 2,5-dichloroaniline is then distilled under vacuum through the same still head (no fractionating column used). The distillate is melted by a Bunsen flame and poured into a glass tray and allowed to crystallize. The solidified product is broken up.

| | |
|---|---|
| Reaction mixture wt. _____g__ | 397.5 |
| Wt. for distillation _____g__ | 387 |
| Dry wt. _____g__ | 319 |
| Wt. distilled product _____g__ | 283.6 |
| Percent yield (based on nitro) _____ | 89.9 |
| Analysis of product: | |
| S.P. (solidification point) _____ | 48.6 |
| Purity (by diazo), percent _____ | 99.9 |

*Example 2*

The procedure of Example 1 is followed except that 2 moles (315.2 g.) 2-chloronitrobenzene is used in place of 384 g. of 2,5-dichloronitrobenzene.

*Example 3*

4-chloronitrobenzene is reduced in a similar fashion to Example 1, giving a product of excellent quality and yield without evidence of dehydrohalogenation.

*Example 4*

4-chloro-3-nitrobenzotrifluoride is reduced according to the procedure in Example 1. The yield of distilled 4-chloro-3-amino benzotrifluoride is approximately 93%.

*Example 5*

Examples 1 through 4 are repeated employing a nickel on kieselguhr catalyst (60% nickel). The amount of catalyst used is sufficient to provide 1% nickel (100% basis) based on the weight of the nitro compound. Excellent results are obtained.

*Example 6*

Examples 1 through 4 are again repeated employing a nickel on alumina catalyst (40% nickel). The amount of catalyst is sufficient to provide 2% nickel (100% basis) based on the weight of the nitro compound. Excellent yields and purity of product are forthcoming.

*Example 7*

Example 1 is repeated employing the following nitro compounds:

(A) 2,3,4-trichloronitrobenzene
(B) 2,6-dibromonitrobenzene
(C) 2-chloro-4-bromonitrobenzene
(D) 4-fluornitrobenzene
(E) 6-fluor-2-nitrotoluene
(F) 2-chloro-5,6-dimethylnitrobenzene

*Example 8*

Example 1 is repeated carrying out the process in a continuous manner using 30 g. of the same catalyst. The throughput rate is maintained at 300 g. nitro compound per hour. The catalyst is held in the 2.5 liter reactor by means of a microporous metal filter which permits withdrawal of product to the exclusion of the catalyst.

*Example 9*

Example 8 is repeated employing 2 reactors in series cascade. Residence time is 40 minutes in the first reactor and 30 minutes in the second one. The latter is initially charged with 5 grams of the nickel catalyst and is retained in the reactor by a metal filter similarly as in the first reactor.

*Example 10*

Example 9 is repeated except that no catalyst retainers are used. The catalyst is permitted to flow from the first to the second reactor and withdrawn with the effluent. It is removed from amine reduction product by centrifuging and recycled. Any loss in catalyst is made up by additions to the final reactor.

*Example 11*

Examples 8, 9 and 10 are repeated employing the nitro compounds of Examples 2, 3, 4 and 7.

*Example 12*

Examples 8, 9 and 10 are repeated using the catalysts of Examples 5 and 6.

Other variations in and modifications of the described processes which will be obvious to those skilled in the art can be made in this invention without departing from the scope or spirit thereof.

We claim:

1. A method for reducing a mono nitro benzene compound where at least one halogen substituent is present in one of the positions ortho and para to the nitro group to the corresponding amino compound in the absence of added solvent which comprises reducing the said nitro compound in the liquid phase with hydrogen in the presence of a nickel catalyst at a temperature of from about 25° C. to about 125° C. and maintaining the water of reaction as a well dispersed separate liquid phase in the reaction zone during the reduction.

2. A method for reducing a mono nitro benzene compound where at least one halogen substituent is present in one of the positions ortho and para to the nitro group to the corresponding amino compound in the absence of added solvent which comprises reducing the said nitro compound in the liquid phase with molecular hydrogen in the presence of a nickel catalyst at a temperature of from about 25° C. to about 125° C. while maintaining the water of reaction as a well dispersed separate liquid phase in the reaction zone during the reduction by means of sufficient agitation of the liquid phase.

3. A continuous method for reducing a mono nitro benzene compound where at least one halogen substituent is present in one of the positions ortho and para to the nitro group to the corresponding amine compound in the absence of added solvent, which comprises introducing into a reaction zone nitro compound in the liquid phase, nickel catalyst and hydrogen, maintaining the reactants in a high state of agitation and continuously withdrawing amino reduction product at a rate equivalent to the feed input rate of nitro compound, the temperature of the reaction zone being maintained at about 25° C. to about 125° C., the water produced during the reaction being maintained as a well dispersed separate liquid phase in the reaction zone during the reduction and being withdrawn from the said reaction zone only as amine reduction product is withdrawn.

4. A method as defined in claim 1 wherein the nitro compound is 2,5-dichloronitrobenzene.

5. A method as defined in claim 1 wherein the nitro compound is 2-chloronitrobenzene.

6. A method as defined in claim 1 wherein the nitro compound is 4-chloronitrobenzene.

7. A method as defined in claim 1 wherein the nitro compound is 4-chloro-3-nitrobenzene trifluoride.

8. A method as defined in claim 4 wherein the temperature of the reaction is about 95° C.

9. A method as defined in claim 5 wherein the temperature of the reaction is about 95° C.

10. A method as defined in claim 6 wherein the temperature of the reaction is about 95° C.

11. A method as defined in claim 7 wherein the temperature of the reaction is about 95° C.

12. A method as defined in claim 3 wherein the nitro compound is 2,5-dichloronitrobenzene.

13. A method as defined in claim 1 wherein the catalyst is Raney nickel.

14. A method as defined in claim 1 wherein the catalyst is nickel on kieselguhr.

15. A method as defined in claim 1 wherein the catalyst is nickel on alumina.

16. A method as defined in claim 8 wherein the catalyst is Raney nickel.

17. A method as defined in claim 8 wherein the catalyst is nickel on kieselguhr.

18. A method as defined in claim 8 wherein the catalyst is nickel on alumina.

19. A method for reducing 2,5-dichloronitrobenzene in the liquid phase and in the absence of added solvent which comprises carrying out the reduction with hydrogen at a temperature of about 95° C. and a pressure of about 100 p.s.i.g. in a reaction zone and in the presence of about 1% Raney nickel based upon the weight of 2,5-dichloronitrobenzene and maintaining the water of reaction as a well dispersed separate liquid phase in the reaction zone during the reduction.

References Cited in the file of this patent

UNITED STATES PATENTS

| | | |
|---|---|---|
| 2,105,321 | Henke et al. | Jan. 11, 1938 |
| 2,292,879 | Kise | Aug. 11, 1942 |
| 2,458,214 | Souders | Jan. 4, 1949 |
| 2,772,313 | Trager | Nov. 27, 1956 |